UNITED STATES PATENT OFFICE.

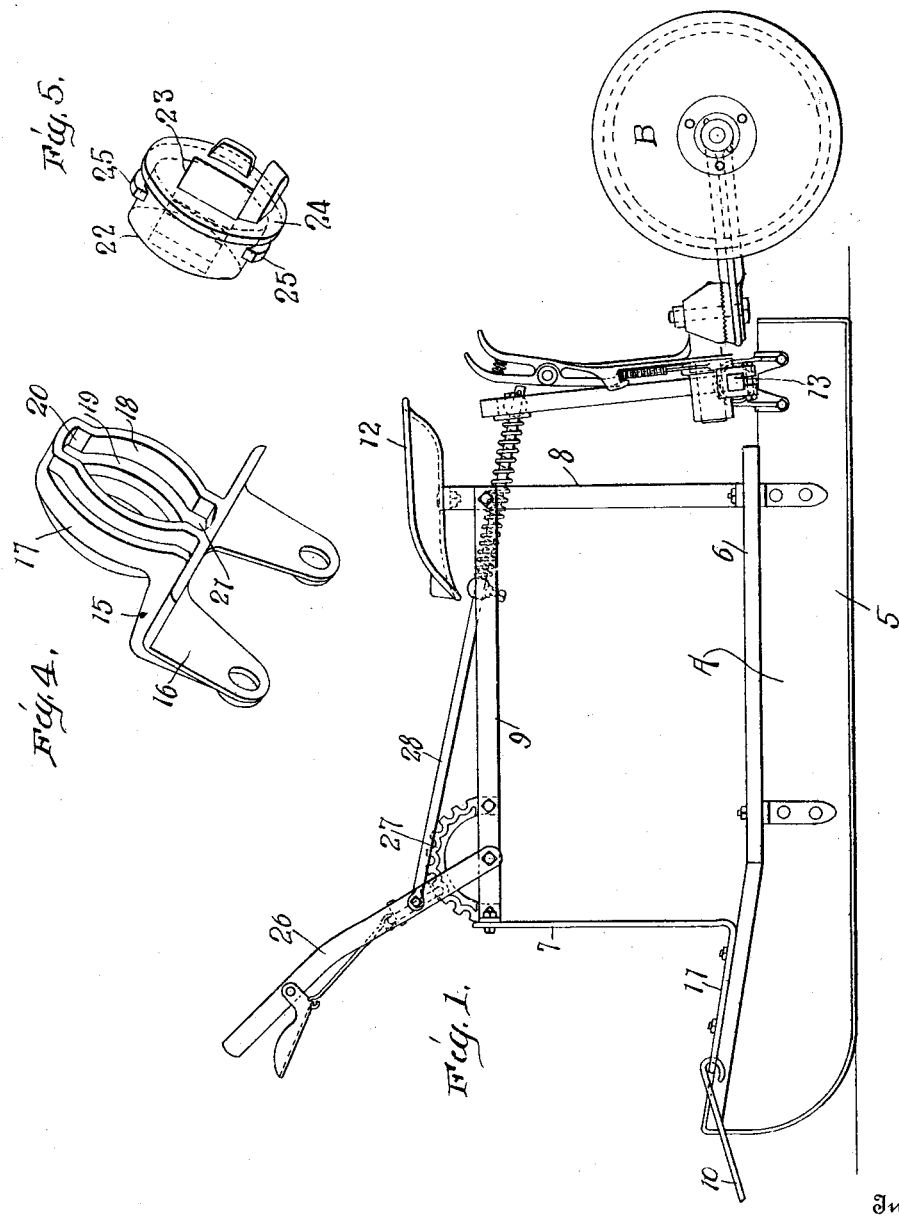

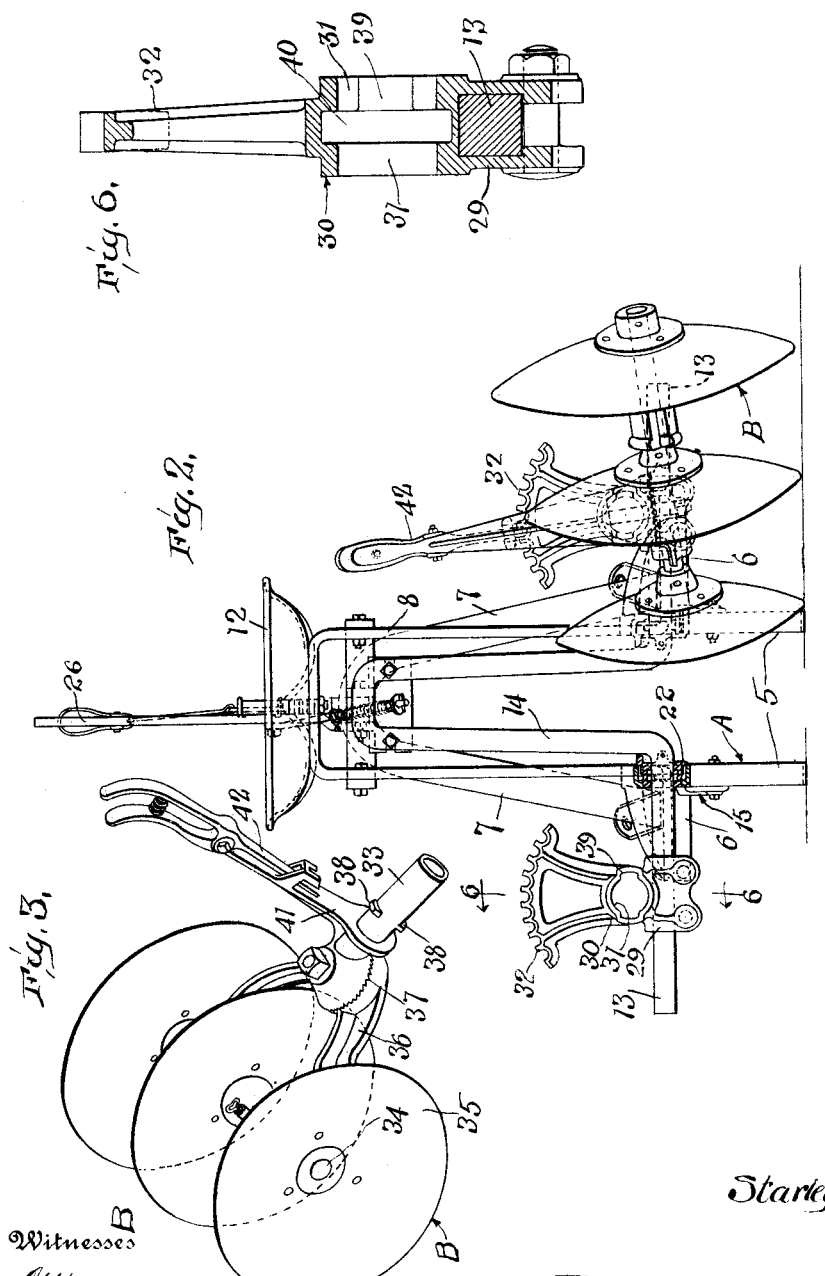

STARLEY S. SWANSON, OF BELLEVUE, OHIO, ASSIGNOR TO THE OHIO CULTIVATOR COMPANY, OF BELLEVUE, OHIO, A CORPORATION OF OHIO.

CULTIVATOR.

1,104,329.  Specification of Letters Patent.  Patented July 21, 1914.

Application filed December 20, 1912. Serial No. 737,796.

*To all whom it may concern:*

Be it known that I, STARLEY S. SWANSON, a citizen of the United States, residing at Bellevue, in the county of Huron and State of Ohio, have invented certain new and useful Improvements in Cultivators, of which the following is a specification, reference being had therein to the accompanying drawing.

This invention relates to new and useful improvements in agricultural implements of that type which are generally known as listed corn cultivators.

The object of this invention is to provide a cultivator of this character, which includes a main frame, with a novel means for separably mounting each disk-gang thereon, whereby the gangs may be readily interchanged whenever it is desired to form a hill and resultant irrigating ditches, or to throw the earth of said hill away from the corn which is growing therein and into the ditches.

Another important object of the invention is to provide a main frame including a pair of runners, a transversely disposed rock shaft, which carries the disk gangs, and separable bearings for said shaft, which serve to lock the runners against relative lateral movements.

In the accompanying drawings, Figure 1 is a side elevation of a cultivator showing one embodiment of my invention, Fig. 2 is a rear end elevation thereof, one of the disk gangs being removed, Fig. 3 is a perspective view of one of the disk gangs, Fig. 4 is a perspective view of one of the fixed bearing members or elements, Fig. 5 is a perspective view of one of the movable bearing elements and Fig. 6 is a cross-sectional view taken on the line 6—6 of Fig. 2.

In these drawings I have illustrated one embodiment of my invention and have shown a main frame A, which in this instance consists of a pair of spaced runners 5—5, and each runner is provided along its upper edge with an outwardly extending lateral wing 6. Arched front and rear brackets 7 and 8 are suitably connected to these wings and serve to hold the runners in parallel relation. These brackets are connected by longitudinal frame members 9, the forward portions of these members being disposed in ground engagement and attached to the front brace 7, and having their rear portions diverging and connected to the rear brace 8. A draft connection 10 of any suitable character is connected to the feet 11 of the front braces 7, and an operator's seat 12 is suitably mounted upon the rear brace 8.

Mounted upon the runners 5 in rear of the wings 6 and rear brace 8, is a rock shaft 13, which, in this instance, is formed from an angular metal bar having its central portion arched as shown at 14. In order to mount this shaft for rotatory movements and also to prevent the rear ends of the runners 5 from spreading laterally in either direction, there is attached to each runner a fixed bearing element 15. This element is formed from a single casting and includes an attaching bracket 16 and a bearing portion 17, the latter being formed with a bearing surface 18. This bearing surface is centrally formed with an annular channel 19, and communicating with this channel and with the inner face of the portion 17, are upper and lower key-ways 20 and 21 respectively.

Associated with each fixed bearing element 15 is a movable bearing element 22, which is likewise formed from a single casting and is of a size to be loosely mounted within the bearing surface 18 of the element 15. The element 22 is formed with an angular longitudinal bore 23 of a size to freely receive the respective end of the rock shaft 13, and in order to limit the inward movement of this element there is provided a peripheral flange 24. The element 22 is furthermore formed with a pair of diametrically opposed lugs 25—25, which are adapted, when the element 22 is being inserted within the element 15, to pass through the keyways 20 and 21 and thence into the channel 19. It will, of course, be understood that the bearing element 22 will then be turned so that the lugs 25 will be disposed out of register with said key-way, thereby forming an interlocking connection between said bearing elements. It will also be noted that the movable element 22 will be capable of having a rotary movement, while in its interlocked relation with element 15, for a distance equal to the distance between the key-ways 20 and 21. The movable elements 22 are fixedly connected in any suitable manner to the rock-shaft 13 and as a result the rear ends of the runners 5 are locked against lateral movements in either direction.

In order to rock the shaft 13 there is provided an operating lever 26, which is fulcrumed upon the forward end of the frame members 9, and this lever coöperates in the usual manner with the segment 27. A link 28 connects the lever 26 with the upper end of the arched portion of the rock shaft 13.

Fixedly attached to each end of the rock shaft 13 is a bracket 29, and attached to this bracket is a fixed bearing 30, which is similar in construction to the bearing 17, above described, the bearing surface 31 thereof being disposed at right-angles to the axis of said shaft. Attached to this bearing and extending upwardly therefrom is a segment 32, said segment being disposed in alinement with the shaft 13. Disk gangs B are each supported upon the rock shaft 13 through the medium of a spindle 33. Each gang includes an axle 34 to which a plurality of disks 35 are attached in any suitable manner, and connected to the axle is a yoke 36 which has an adjustable connection 37 with said spindle 33. The spindle 33 is formed with diametrically opposed lugs 38—38, which are adapted, when the spindle is inserted within the fixed bearing 30, to enter the key-ways 39 and the channel 40. Rigidly attached to each spindle is a hand-lever 41, and carried by this lever is a pawl 42, which coöperates with the segment 30 to lock the spindle 33, and consequently the disk-gang B, at any angle about the axis of the spindle, but within the limit of movement of the spindle in its interlocked relation.

In practice, when it is desired to form a hill and resultant ditches on either side thereof, the hand-levers 41 are shifted outwardly so as to throw the axles 34 of the gangs B in downwardly inclined positions. It will be noted that the levers 42 constitute adjusting devices for the respective gangs and are connected to and removable with said gangs. It will also be noted that through the medium of this adjusting device the spindles of the respective gangs may be locked against rotary movement so as to prevent the separation of the interlocking connections between the bearings and the spindles. It will be readily observed that the height of the hill may be regulated by the angle to which the gangs B are placed, and when it is desired to lower the hill on either side of the corn which is being grown therein, the hand-levers 41 are shifted inwardly, thereby throwing the axles 34 of said gangs in upwardly inclined positions. When it is desired to throw the earth toward or away from the corn, the gangs B may be readily interchanged at will, as all that is necessary to effect such a change is to rotate the spindles 33 in a half circle until the lugs 38 register with the key-ways 39. In these positions the gangs B may be readily removed and interchanged at will. By manipulating the hand lever 26, the rock shaft 13 will be moved, and as a result, the wings B will be raised or lowered as the case may be, the positions of the wings being determined by the height of the hill desired to be made, or by the amount of earth desired to be moved toward or away from the corn.

I claim—

1. In a cultivator, the combination, with a frame, and disk gangs arranged on opposite sides thereof, of interlocking connections between the gangs and the frame whereby said gangs may be readily interchanged, and a lever connected to and removable with each of said gangs to adjust the same relatively to said frame and prevent the separation of said interlocking connections.

2. In a cultivator, the combination, with a frame, and a bearing carried thereby, of a spindle journaled in said bearing, said bearing and said spindle having coöperating parts arranged to be moved into and out of interlocking engagement by the rotation of one of said members, an earth-engaging tool carrying said spindle, and means for locking the spindle against rotation to retain the same in adjusted positions and to retain said parts in interlocking engagement.

3. In a cultivator, the combination, with a frame, and a bearing carried thereby, of a spindle journaled in said bearing, said bearing and said spindle having coöperating parts arranged to be moved into and out of interlocking engagement by the rotation of one of said members, an earth-engaging tool carrying said spindle, and a lever mounted on and removable with said spindle, and a part carried by said bearing and coöperating with said lever to adjust said earth-engaging tool relatively to said frame and to retain said parts in interlocking engagement.

4. In a cultivator, the combination with a frame and a bearing carried thereby, of a spindle journaled in said frame and having interlocking connection therewith and adapted to have a limited rotatory movement in its locked position, an earth-engaging tool gang carried by said spindle, and means for simultaneously locking the gang at a predetermined angle within the limit of movement of the spindle in its locked position and locking the interlocking parts of said connection against separation.

5. In a listed corn cultivator, the combination with a pair of runners, of a transverse shaft, separable interlocking bearings respectively connected to the runners and shaft, and an earth engaging tool connected to said shaft.

In testimony whereof, I affix my signature in presence of two witnesses.

STARLEY S. SWANSON.

Witnesses:
E. H. ERDRICH,
E. A. KEMP.

Copies of this patent may be obtained for five cents each, by addressing the "Commissioner of Patents Washington, D. C."